(12) United States Patent
Fujita et al.

(10) Patent No.: US 11,056,303 B2
(45) Date of Patent: Jul. 6, 2021

(54) RELAY DEVICE

(71) Applicant: Nissan Motor Co., Ltd., Kanagawa (JP)

(72) Inventors: Yoshimi Fujita, Kanagawa (JP); Tsuyoshi Enokida, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 74 days.

(21) Appl. No.: 16/474,843

(22) PCT Filed: Dec. 28, 2016

(86) PCT No.: PCT/JP2016/089157
§ 371 (c)(1),
(2) Date: Jun. 28, 2019

(87) PCT Pub. No.: WO2018/123036
PCT Pub. Date: Jul. 5, 2018

(65) Prior Publication Data
US 2020/0411265 A1 Dec. 31, 2020

(51) Int. Cl.
*H01H 47/00* (2006.01)
*H02J 7/00* (2006.01)
*H02J 7/34* (2006.01)

(52) U.S. Cl.
CPC ........ *H01H 47/002* (2013.01); *H01H 47/001* (2013.01); *H02J 7/0068* (2013.01); *H02J 7/345* (2013.01); *H02J 2207/50* (2020.01)

(58) Field of Classification Search
CPC ...... H02J 7/0068; H02J 7/345; H02J 2207/50; H01H 47/001; H01H 47/002
See application file for complete search history.

(56) References Cited

U.S. PATENT DOCUMENTS 6,301,091 B1 * 10/2001 Zomchek ............ H01H 47/002
361/189
2005/0231029 A1 * 10/2005 Sakata .................... B60T 17/18
303/118.1

(Continued)

FOREIGN PATENT DOCUMENTS

| JP | 2007-258109 A | 10/2007 |
| JP | 2007-276552 A | 10/2007 |
| JP | 2014-120380 A | 6/2014 |

*Primary Examiner* — Richard Isla
*Assistant Examiner* — Johali A Torres Ruiz
(74) *Attorney, Agent, or Firm* — Osha Bergman Watanabe & Burton LLP

(57) ABSTRACT

A relay device includes a controller, a capacitor included in a charger, and a discharge circuit that discharges electric charge charged to the capacitor. The discharge circuit includes a discharge resistance, a first relay switch connected to the discharge resistance and having a contact point that becomes a closed state by electric conduction to an exciting coil, and a second relay switch connected in parallel to the first relay switch and having a contact point that becomes an open state by electric conduction to an exciting coil. The controller, by mutually switching between a state in which the first relay switch is turned on and the second relay switch is turned off and a state in which the first relay switch is turned off and the second relay switch is turned on, determines abnormality of the first relay switch and the second relay switch.

6 Claims, 6 Drawing Sheets

(56) References Cited

U.S. PATENT DOCUMENTS

| | | | |
|---|---|---|---|
| 2006/0021098 A1* | 1/2006 | Tezuka | H01H 47/002 477/7 |
| 2007/0221627 A1 | 9/2007 | Yugou et al. | |
| 2010/0295506 A1* | 11/2010 | Ichikawa | B60L 53/62 320/108 |
| 2014/0354054 A1* | 12/2014 | Katou | H02J 7/0029 307/43 |
| 2015/0054517 A1* | 2/2015 | Yonezaki | B60L 3/0046 324/418 |
| 2015/0115740 A1* | 4/2015 | Miura | H01H 1/62 307/117 |

\* cited by examiner

RELAY DEVICE

BACKGROUND

Technical Field

The present invention relates to a relay device.

Related Art

Conventionally, when there is a conduction abnormality between relay contacts, a power-supply relay control device that removes a film of ice that exists between the relay contacts by opening and closing a power supply relay circuit while allowing predetermined potential difference between the relay contacts is disclosed (Patent Document 1).
Patent Document 1: JP 2014-120380 A
Patent Document 2: JP2007-276552 A

SUMMARY OF INVENTION

However, the relay device cannot be operated normally when the ice film cannot be removed.

One or more embodiments of the present invention provides a relay device that can operate normally under an environment where freezing easily occurs.

One or more embodiments of the present invention includes a discharge resistance that discharges electric charge charged to a capacitor and a parallel circuit connecting a first relay switch and second relay switch in parallel, wherein the parallel circuit is connected to the discharge resistance, wherein a contact point of the first relay switch is a contact point that becomes generally open by electric conduction, and wherein a contact point of the second relay switch is a contact point that becomes generally closed by electric conduction.

According to one or more embodiments of the present invention, a relay device can be normally operated under an environment where freezing easily occurs.

DETAILED DESCRIPTION

In the following, embodiments of the present invention are described based on the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
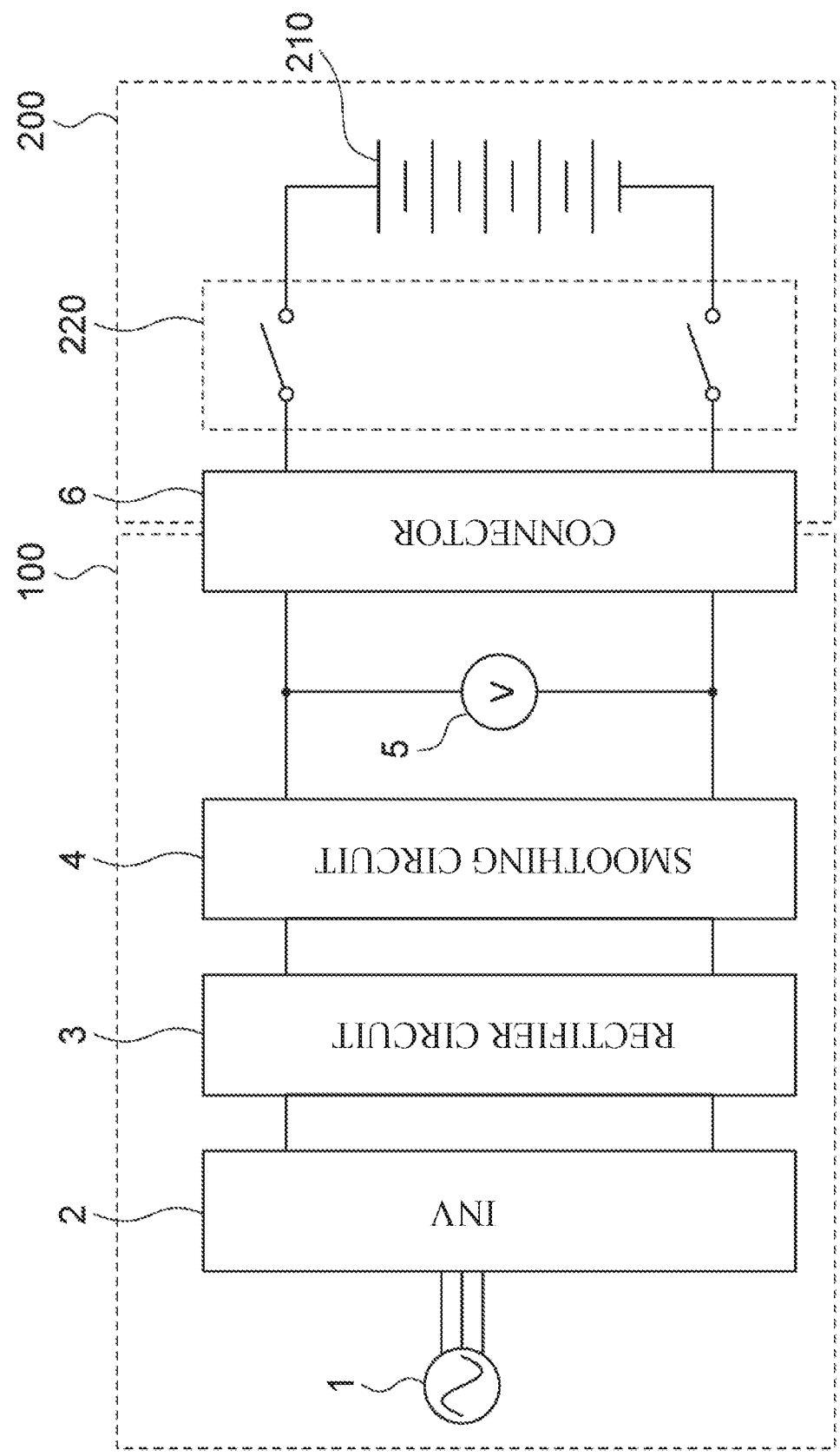
FIG. 1 is a schematic diagram of a charger and a vehicle including a relay device according to one or more embodiments of the present invention.

FIG. 1 is a schematic diagram of a charger and a vehicle including a relay device according to one or more embodiments of the present invention. A charger 100 is a charging device for a vehicle. The charger 100 is connected to a vehicle 200 via a charging cable. The charger 100 is installed at a place where stable power supply can be secured like a parking place.

The vehicle 200 is an electrically driven vehicle including a battery such as an electric vehicle or a hybrid vehicle.

As shown in FIG. 1, the charger 100 includes an AC power supply 1, an inverter 2, a rectifier circuit 3, a smoothing circuit 4, a voltage sensor 5, and a connector 6. The AC power supply 1 outputs AC power of three-phase 200V, for example. The inverter (INV) 2 is a circuit for converting alternating current input from the AC power supply to direct current. The inverter 2 is connected between the AC power supply 1 and the rectifier circuit 3.

The rectifier circuit 3 rectifies the output current output from the inverter 2. The rectifier circuit 3 is connected to the output side of the inverter 2. The smoothing circuit 4 smooths the waveform of the output power rectified by the rectifier circuit. The smoothing circuit 4 at least includes a capacitor for smoothing. The charger 100 charges a battery for a vehicle in a state where the capacitor for smoothing is being charged.

The voltage sensor 5 is connected in parallel to the capacitor of the smoothing circuit 4. The voltage sensor 5 detects output voltage of the charger 100 by detecting voltage of the capacitor.

The connector 6 is a tool connected to a charging port of a vehicle and is arranged to an end part of a charge cable.

The vehicle 200 includes a battery 210 and a relay for a vehicle 220. The battery 210 is configured by connecting a plurality of secondary batteries such as a lithium-ion battery and nickel-hydrogen battery, etc. The battery 210 becomes a power source of the vehicle. The relay for a vehicle 220 is a relay switch for switching electrical conduction and shut-off between the battery 210 and a charging port (corresponds to the connection destination of the connector 6). More, in FIG. 1, only some of the components related to external charging among the components of the vehicle 200 are shown. The vehicle 200 is not limited to the battery 210 and relay for a vehicle 220, and other components such as a motor, etc., is included.

Figure 2:
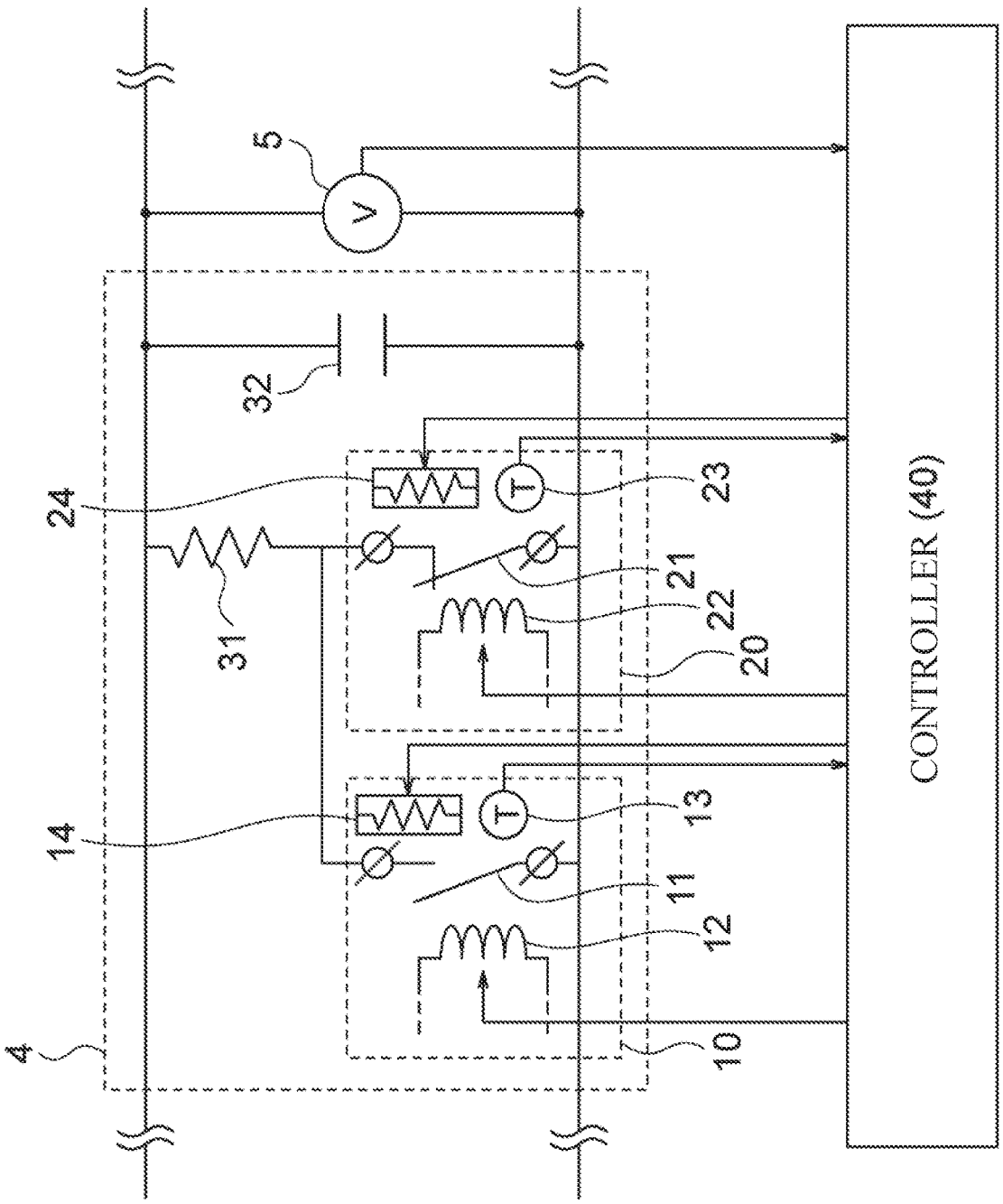
FIG. 2 is a schematic diagram of the relay device shown in FIG. 1.

Next, using FIG. 2, a relay device according to one or more embodiments of the present invention will be described. FIG. 2 is a schematic diagram of a relay device. The relay device is mounted onto a charger 100. The relay device includes a smoothing circuit 4 contained in the charger 100, a voltage sensor 5, and a controller 40.

The smoothing circuit 4 includes a first relay unit 10, a second relay unit 20, a discharge resistance 31, and a capacitor 32. The capacitor 32 is the capacitor for smoothing.

The first relay unit 10 includes a relay contact 11, an exciting coil 12, a temperature sensor 13, and a heater 14. The relay contact 11, exciting coil 12, temperature sensor 13, and heater 14 are housed in a case.

The relay contact 11 is a contact point (contact point a) that becomes a closed state (an ON state) by electric conduction to the exciting coil 12. The relay contact 11 is usually open and becomes a closed state by electric conduction to the exciting coil 12. The relay contact 11 is a contact point that is usually open. The relay contact 11 is connected in series relative to a discharge resistance 31.

The exciting coil 12 switches ON and OFF of the relay switch by mechanically moving the relay contact 11 by generating a magnetic field. The exciting coil 12 is arranged near the relay contact 11. The relay contact 11 and exciting coil 12 function as a first relay switch. The temperature sensor 13 is a sensor for detecting temperature of the relay contact 11. The heater 14 is arranged near the relay contact 11 and warms the relay contact 11.

The second relay unit 20 includes a relay contact 21, an exciting coil 22, a temperature sensor 23, and a heater 24. The relay contact 21, exciting coil 22, temperature sensor 23, and heater 24 are housed in a case.

The relay contact 21 is a contact point (contact point b) that becomes an open state (an OFF state) by electric conduction to the exciting coil 22. The relay contact 21 is usually closed. When a charging device 1 is not driven, and when the charging device 1 charges the battery 210 for a vehicle, the relay contact 21 is in an open state by electric conduction to the exciting coil 22. The relay contact 21 is connected in series relative to the discharge resistance 31. More, the relay contact 11 and relay contact 21 are connected in parallel.

The exciting coil 22 switches ON and OFF of the relay switch by mechanically moving the relay contact 21 by generating a magnetic field. The exciting coil 22 is arranged near the relay contact 21. The relay contact 21 and exciting coil 22 function as a second relay switch. The temperature sensor 23 is a sensor for detecting temperature of the relay contact 21. The heater 24 is arranged near the relay contact 21 and warms the relay contact 21.

A parallel circuit formed by the relay contact 11 and relay contact 21 is connected in series to a discharge resistance 31. Then, a connection circuit to the parallel circuit, which are formed by the relay contact 11 and relay contact 21, and the discharge resistance 31 are connected in parallel relative to the capacitor 32. When at least either one of the relay contact 11 and relay contact 21 becomes a closed state, between the discharge resistance 31 and the capacitor 32 becomes conducted and the electric charge charged to the capacitor 32 is discharged. In other words, the circuit formed by the first relay unit 10, second relay unit 20, and discharge resistance 31 corresponds to a discharge circuit for discharging the electric charge of the capacitor 32.

The discharge resistance 31 is a resistance for discharging the electric charge charged to the capacitor 32. The discharge resistance 31 is connected between a pair of power supply lines (corresponds to an output line of the inverter 2).

The controller 40 controls the first relay unit 10 and second relay unit 20. The controller 40 controls the discharge circuit by switching ON and OFF of the electric conduction to the exciting coil 12 and ON and OFF of the electric conduction to the exciting coil 22. The detected voltage by the voltage sensor and detected temperatures by the temperature sensors 13 and 23 are input to the controller 40. Also, the controller 40 switches ON and OFF of the heaters 14 and 24.

Figure 3:
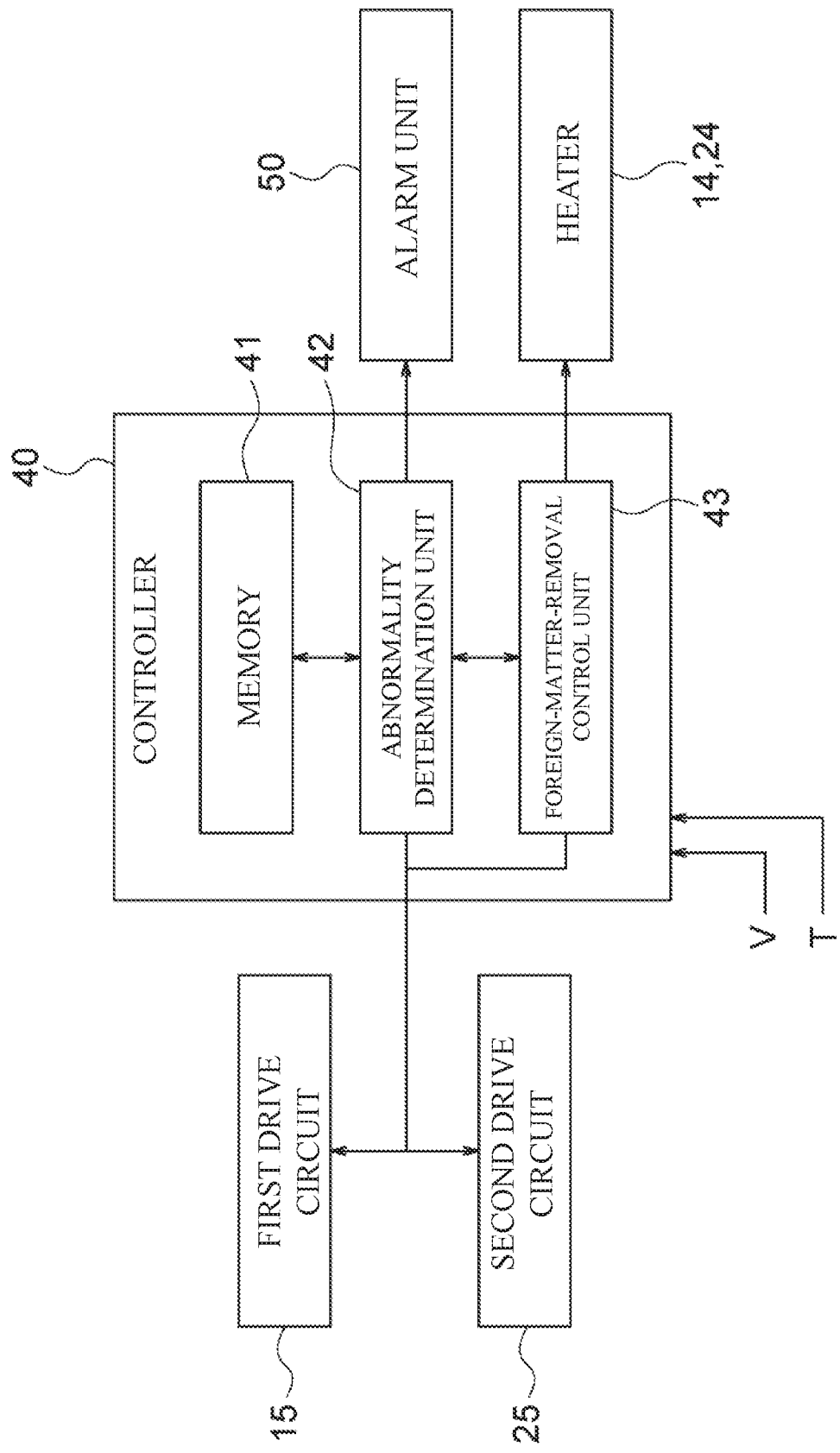
FIG. 3 is a block diagram of a controller shown in FIG. 2.

Next, using FIG. 3, structure of the controller 40 will be described. FIG. 3 is a block diagram of the components controlled by the controller 40 and the controller 40.

The first drive circuit 15 is connected to the exciting coil 12. The first drive circuit 15 includes a switch, a power supply, etc. The first drive circuit 15 drives the first relay unit 10 by conducting current to the exciting coil 12.

The second drive circuit 25 is connected to the exciting coil 22. The second drive circuit 25 includes a switch, a power supply, etc. The second drive circuit 25 drives the second relay unit 20 by conducting current to the exciting coil 22.

The controller 40 includes a memory 41, an abnormality determination unit 42, and a foreign-matter-removal control unit 43. The controller 40 includes a CPU, RAM, etc., in addition to the memory 41. More, the controller 40 includes an abnormality determination unit 42 and a foreign-matter-removal control unit 43 as a functional block of an abnormality determination function and relay protection function. The abnormality determination unit 42 determines whether any abnormalities are generated to each of the first relay unit 10 and second relay unit 20. The foreign-matter-removal control unit 43 melts ice adhered to the relay contacts 11 and 21 by raising temperature of the heaters 14 and 15. Further, the foreign-matter-removal control unit 43, by switching ON and OFF of the relay switch included in the first relay unit 10 and second relay unit 20 via the first drive circuit 15 and second drive circuit 25, removes foreign matters adhered to the relay contact.

Now, freezing of the relay contacts 11 and 21 is explained. When the charger 100 is under a low-temperature environment, moisture of the relay unit becomes ice and there is a risk of freezing of the relay contact. How often freezing occurs differ according to the inner structure and characteristics of the contact point, etc., of the relay unit. Freezing easily occurs when ambient temperature of the relay contact and temperature of the relay contact (temperature of the contact point part) differ greatly.

In a relay device according to one or more embodiments of the present invention, the relay contact 11 is a contact point a that becomes a closed state by electric conduction. When the charger 100 does not drive, current is not flowing to the exciting coil 12 and the relay contact 11 becomes an open state. Accordingly, a temperature difference between an ambient temperature of the relay contact 11 and temperature of the relay contact at the start of driving the charger 1 is small.

On the other hand, the relay contact 21 is a contact point b that becomes an open state by electric conduction. When the charger 100 does not drive, a state of flowing current to the exciting coil 22 is maintained and the relay contact 21 becomes an open state. Since the temperature of the exciting coil 22 becomes high by the electric conduction of the exciting coil 22, the ambient temperature of the relay contact 21 becomes higher than the temperature of the relay contact 21. By the temperature difference of the ambient temperature of the relay contact 21 and temperature of the relay contact 21, surface moisture of the relay contact condenses and moisture of the dew condensation becomes a film of ice. Then, such freezing triggers relay contact failures.

More, when charge of the charger 100 ends and discharge of the electric charge of the capacitor 32 ends, the controller 40 flows current to the exciting coil 22 and the relay contact 21 becomes an open state. When the relay contact 21 becomes an open state, in a process of lowering the temperature of the relay contact 21 and peripheral temperature of relay contact 21, temperature difference increases since the contact point temperature of the relay contact 21 becomes lower than the ambient temperature of the relay contact 21 because the current is flowing to the exciting coil 22. For this reason, freezing occurs at the relay contact and leads to a relay contact failure.

In one or more embodiments of the present invention, because freezing easily occurs at the relay contact 21, a relay contact 11 is connected in parallel to the relay contact 21. In one or more embodiments of the present invention, when a contact failure of the relay contact 21 occurs by the freezing of the relay contact 21, the electric charge of the capacitor 32 can be discharged using the relay contact 11. In this way, in one or more embodiments of the present invention, even under an environment where freezing easily occurs, the relay device can be normally operated.

Figure 4:
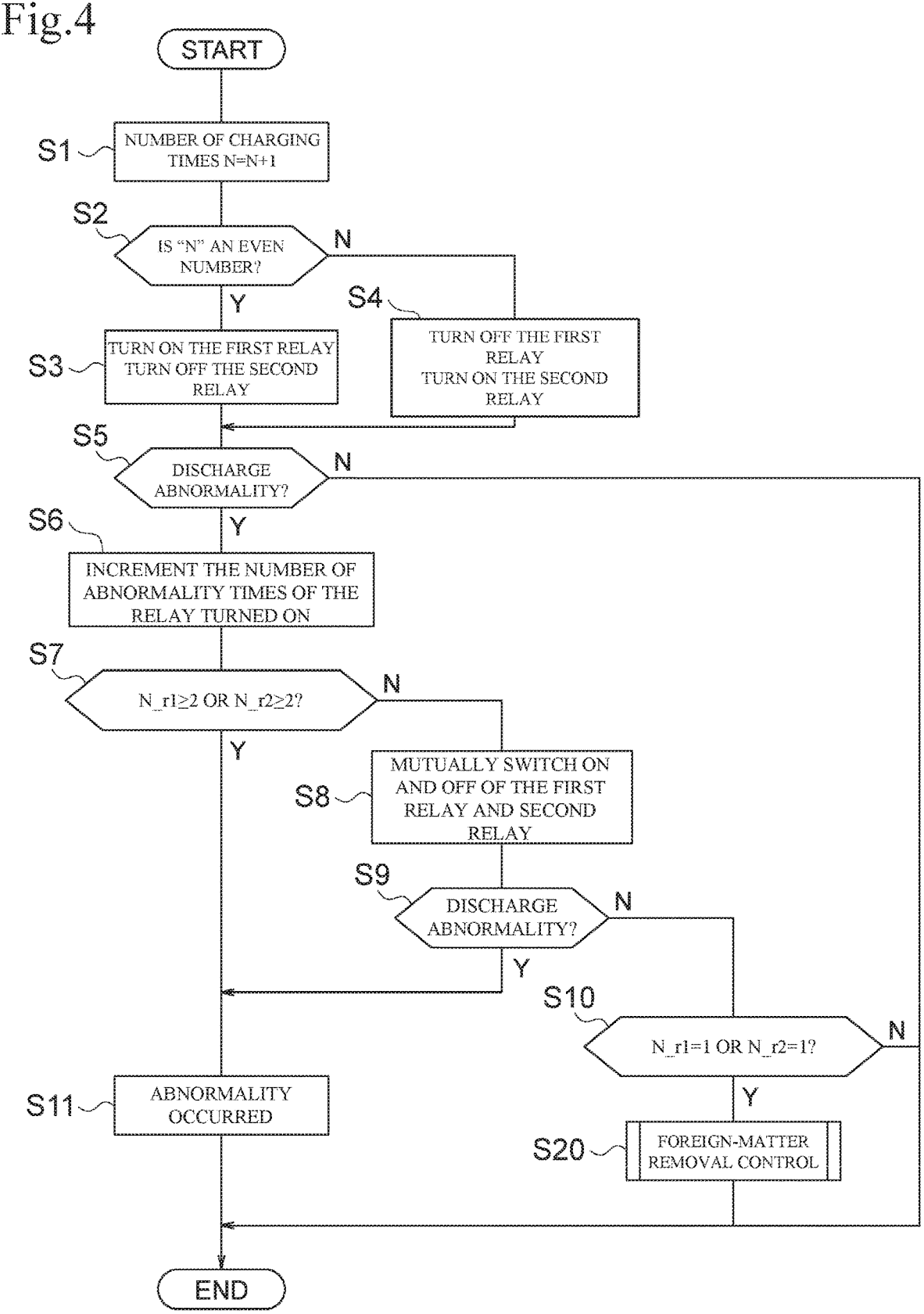
FIG. 4 is a flowchart showing a control flow of a controller.

Next, using FIG. 4, a control flow of abnormality determination control by the abnormality determination unit 42 will be described. FIG. 4 is a flowchart illustrating a control flow of the controller 40. The control flow shown in FIG. 4 is executed when the electric charge of the capacitor 32 is discharged after charging of the charger 100. The controller 40 executes the control flow shown in FIG. 4 at every timing charging of the controller 40 ends.

In step 1, the abnormality determination unit 42 increments the number of charging times "N". The incremented number of charging times "N" is stored to a memory 41 for use in the next abnormality determination after charge. In step 2, the abnormality determination unit 42 determines whether or not "N" is an even number.

When "N" is an even number, the abnormality determination unit 42 turns on the relay contact (first relay) 11 in step 3 and turns off the relay contact (second relay) 21. On the other hand, when "N" is an odd number, the abnormality determination unit 42 turns off the relay contact 11 and turns on the relay contact 21 in step 4.

In step 5, the abnormality determination unit 42 determines whether or not discharge abnormality has occurred. Specifically, the abnormality determination unit 42 detects output voltage of the capacitor 32 using a voltage sensor 5 in a state either of the relay contact 11 or relay contact 21 is turned ON. The abnormality determination unit 42 determines whether or not the output voltage of the capacitor 32 is higher than a threshold voltage. The threshold voltage is a threshold value for detecting discharge abnormality. When the output voltage of the capacitor 32 is higher than the threshold voltage, the abnormality determination unit 42 determines that discharge abnormality has occurred by abnormality of the relay switch that is in an ON state. Whereas, when the output voltage of the capacitor 32 is the threshold voltage or lower, the abnormality determination unit 42 determines that the relay in the ON state is normal and that discharge is normally performed.

For example, after the control flow in step 3, when the output voltage of the capacitor of the capacitor 32 is higher than the threshold voltage, since the capacitor 32 is not electrically conducted with the discharge resistance 31 via the relay contact 11, the electric charge of the capacitor 32 will not be discharged. Accordingly, the abnormality determination unit 42 determines that there is discharge abnormality.

The controller 40 ends the control flow when determining that the discharge is normally performed. In step 6, the abnormality determination unit 42 increments the number of abnormalities ($N_{-r1}$ or $N_{-r2}$) of the relay, when determining that there is discharge abnormality. The number of abnormalities ($N_{-r1}$ or $N_{-r2}$) indicates the number of times the abnormality determination unit 42 determined that discharge abnormality has occurred. $N_{-r1}$ indicates the number of abnormalities of the relay contact 11 and $N_{-r2}$ indicates the number of abnormalities of the relay contact 21.

For example, in the control flow in step 4, after turning off the relay contact 11 and turning on the relay contact 21, when determination is made that there is discharge abnormality in the control flow in step 5, the abnormality determination unit 42 increments the number of abnormalities ($N_{-r2}$) of the relay contact 21.

In step 7, the abnormality determination unit 42 determines whether or not the number of abnormalities ($N_{-r1}$) or the number of abnormalities ($N_{-r2}$) is 2 or greater.

When the number of abnormalities ($N_{-r1}$) or the number of abnormalities ($N_{-r2}$) is 2 or greater, in step 11, the abnormality determination unit 42 determines that there is abnormality in the relay contact 11 or relay contact 21 whose number of abnormalities ($N_{-r1}$ or $N_{-r2}$) is 2 or greater. In other words, when the abnormality determination unit 42 determines that discharge abnormality has occurred for 2 or more times in a row in either relay contact 11 or relay contact 21 between the relay contact 11 and relay contact 21, the abnormality determination unit 42 determines that there is abnormality in relay contacts 11 and 21. In this way, determination accuracy can be improved. When determination is made that there is abnormality in the relay contacts 11 and 21, the abnormality determination unit 42 notifies the abnormality of the relay contacts 11 and 21 to a user using an alarm unit.

In the determination control in step 7, when the number of abnormalities ($N_{-r1}$) or the number of abnormalities ($N_{-r2}$) is less than 2, the abnormality determination unit 42 turns off the relay contact 11 or 21 that was ON, and turns on the relay contact 11 or 21 that was OFF.

For example, in the control flow in step 3, after turning on the relay contact 11 and turning off the relay contact 21, when determination is made that there is discharge abnormality in the control flow in step 5, the abnormality determination unit 42 increments the number of abnormalities ($N_{-r1}$) of the relay contact 11. For convenience, assume that the number of abnormalities ($N_{-r1}$) is changed to "1" from "0", and the number of abnormalities ($N_{-r2}$) is "0" in this case. Since the number of abnormalities ($N_{-r1}$, $N_{-r2}$) is less than "2", the control flow proceeds to step 8 from step 7. In the control flow of step 3, since the relay contact 11 is ON and the relay contact 21 is OFF, the abnormality determination unit 42 switches the relay contact 11 from ON to OFF in step 8, and the relay contact 21 from OFF to ON.

In step 9, the abnormality determination unit 42 determines whether or not discharge abnormality has occurred. A determination method of the discharge abnormality is the same as the determination method in step 5. When determination is made that there is discharge abnormality, the abnormality determination unit 42 determines that abnormality has occurred in relay contacts 11 and 21 in step 11. When the abnormality determination unit 42 determines that there is discharge abnormality in the control flow in step 9, it is also determined that there is discharge abnormality in the control flow in step 5. In other words, since each of the relay contact 11 and relay contact 21 is determined to have abnormality once, in the end, the abnormality determination unit 42 determines that abnormality has occurred in the relay contacts 11 and 21. In this way, safety can be enhanced.

In the control flow in step 9, when determination is made that discharge is normally performed, the control flow proceeds to step 10. In step 10, the abnormality determination unit determines whether or not the number of abnormalities ($N_{-r1}$) or the number of abnormalities ($N_{-r2}$) is "1". When the number of abnormalities ($N_{-r1}$) or the number of abnormalities ($N_{-r2}$) is not "1", the controller 40 ends the control flow. When the abnormality determination unit determines that there is discharge abnormality, the controller 40 performs a foreign-matter removal control in step 20.

Figure 5:
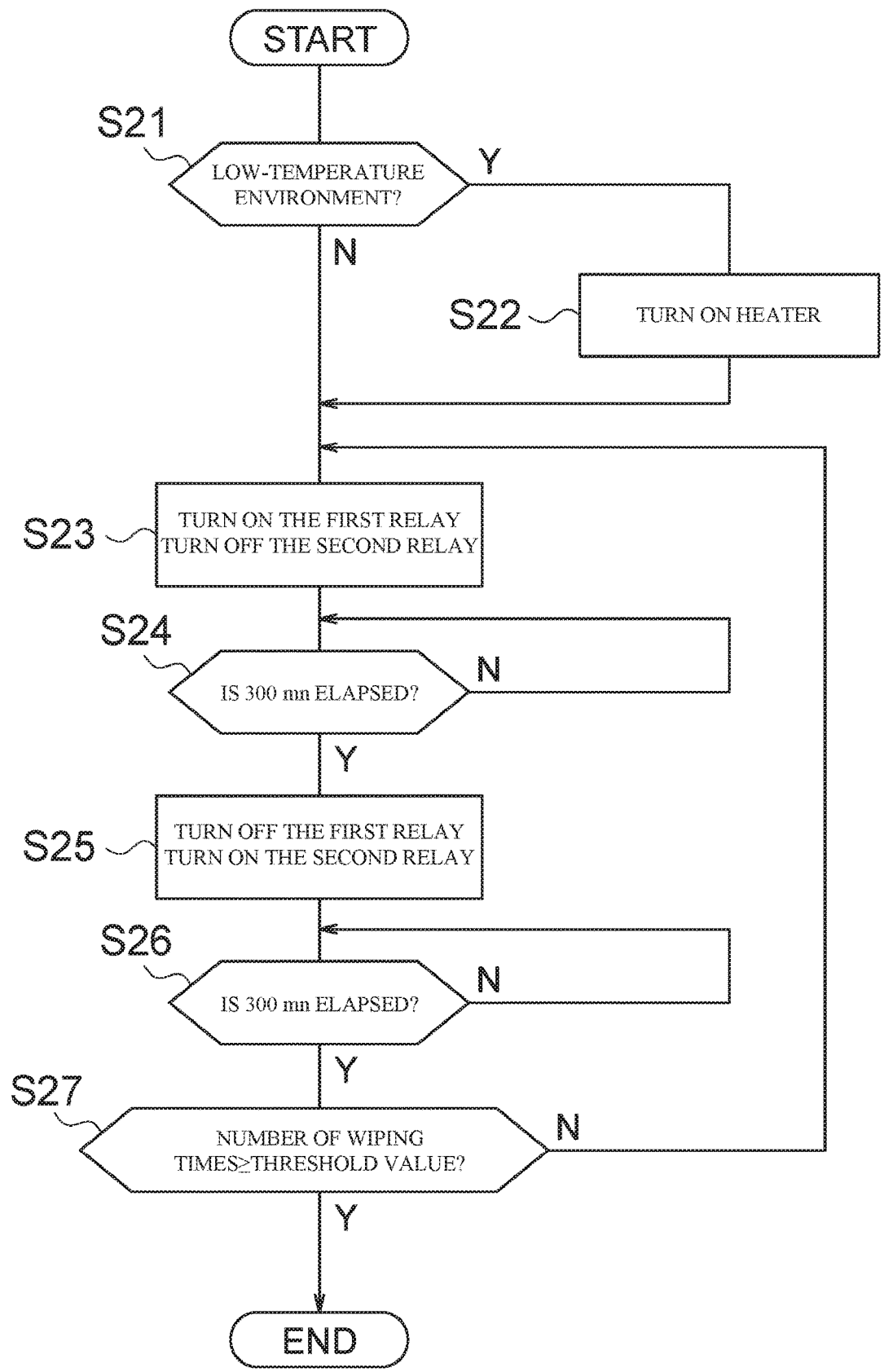
FIG. 5 is a flowchart showing a control flow of a foreign-matter removal control.

Using FIG. 5, a control flow of the foreign-matter removal control will be explained. FIG. 5 is a flowchart showing a control flow of the foreign-matter removal control.

In step 21, the foreign-matter removal control unit 43 detects temperatures of the relay contact 11 and 21 using the temperature sensors 13 and 23. In step 22, the foreign-matter removal control unit 43 determines whether or not the detected temperature is lower than a temperature threshold value. The temperature threshold value is a threshold value indicating a low-temperature environment. The temperature of the low-temperature environment is the temperature where freezing easily occurs.

When determination of a low-temperature environment is made, the foreign-matter-removal control unit 43 turns on the heaters 14 and 24 in step 22. When the temperature of the relay contacts 11 and 21 becomes the temperature threshold value or higher, the foreign-matter-removal control unit 43 executes a control flow of step 23.

In step 23, the foreign-matter-removal control unit 43 turns on the relay contact (first relay) 11 by flowing current to the exciting coil 12, and turns off the relay contact (second relay) 21 by not flowing current to the exciting coil 22. In step 24, the foreign-matter-removal control unit 43 turns on the switch included in the first drive circuit 15, measures an elapsed time from the time the current was flowed to the exciting coil 12, and determines whether or not the elapsed time has reached 300 ms. Practically, since there is a delay time until the current flows to the exciting coil 12, a standby time (300 ms) is arranged. When 300 ms elapses, the control flow proceeds to step 25. Additionally, the standby time is not necessarily set to 300 ms.

In step 25, the foreign-matter-removal control unit 43 turns off the relay contact 11 by stopping electric conduction to the exciting coil 12. Also, the foreign-matter-removal control unit 43 turns on the relay contact 21 by flowing current to the exciting coil 22. In step 26, the foreign-matter-removal control unit 43 turns on the switch included in the second drive circuit 25, measures an elapsed time from the time the current was flowed to the exciting coil 22, and determines whether or not the elapsed time has reached 300 ms. When 300 ms elapses, the control flow proceeds to step 27.

In step 27, the foreign-matter-removal control unit 43 determines whether or not the number of wiping times is the predetermined threshold value or greater. The number of wiping times indicates the number of times switched between ON and OFF in the relay contacts 11 and 21, and a cycle from step 23 to step 25 is considered as one cycle. The threshold value is the number of end timings in wiping indicated by the number of times. For example, the threshold value is set to twice. Wiping is a repeated movement of mechanical switching between ON and OFF of the relay contacts 11 and 21.

When the number of wiping times is less than the predetermined threshold value, the foreign-matter-removal control unit 43 increments the number of wiping times and then executes the control flow in step 23. When the number of wiping times is the threshold value or greater, the foreign-matter-removal control unit 43 ends the foreign-matter removal control flow. The controller 40 ends the control flow.

In one or more embodiments of the present invention, by performing wiping, impurities such as dust and an oxide film, etc., adhered to the relay contacts 11 and 21 can be removed. Also, when the relay contacts 11 and 21 are under low-temperature environment and in a state where freezing easily occurs, heaters 14 and 24 are used to raise the contact point temperature up to the temperature where freezing does not occur easily. In this way, when ice is adhered to the relay contacts 11 and 21, the ice can be easily removed. Also, by performing the heater operation and wiping operation in combination, removal of the foreign matters becomes easy.

As above, in one or more embodiments of the present invention, the capacitor 32 included in the charger 100 and the discharge circuit for discharging the electric charge charged to the capacitor 32 are included. The discharge circuit includes a discharge resistance 31, a first relay switch connected to the discharge resistance 31 and including a relay contact 11 which becomes a closed state by electric conduction, and a second relay switch connected to the first relay switch in parallel and including a relay contact 21 which becomes an open state by electric conduction. In this way, the relay switch can be normally operated under conditions where freezing easily occur.

Additionally, for the relay switch arranged in the charger 100, in order to electrically conduct the discharge resistance 31 and capacitor 32 when an interruption of the power supply occurs during charge, a contact point b is adopted. Since the contact point b becomes an ON state even under a state where no current is flowing to the exciting coil, even when an interruption of the power supply occurs during charge, the discharge resistance 31 and capacitor 32 can be conducted.

However, the relay switch including the contact point b needs to flow current to the exciting coil in order to separate the discharge resistance 31 and capacitor 32 when the charger 100 does not drive. Also, when charger 100 is started under a low-temperature environment, in order to maintain a state the discharge resistance 31 and capacitor 32 are put apart from each other during charging of the battery, current must be flowed to the exciting coil. Then, by the electric conduction to the exciting coil, the contact point temperature at the contact point b becomes lower than the ambient temperature of the contact point and temperature difference increases. As a result, freezing occurs at the contact point b.

Next, when freezing occurs at the contact point b, even when the contact point b is turned ON to discharge the electric charge of the capacitor 32, the discharge resistance 31 and capacitor 32 are not connected and becomes a state where no discharge can be performed.

In one or more embodiments of the present invention, to the relay contact 21 which is the contact point b, the relay contact 11, which is a contact point a, is connected in parallel. The contact point a is a switch where freezing does not occur easily compared to the contact point b. For this reason, even when freezing occurs at the contact point b, discharge can be performed using the contact point a. In this way, while securing safety for a case where an interruption of the power supply occurs during charge, the relay device can be normally operated even under a condition freezing easily occurs.

Further, in one or more embodiments of the present invention, by mutually switching between states the first relay switch is turned on and the second relay switch is turned off, and the first relay switch is turned off and second relay switch is turned on, abnormality in the first relay switch and the second relay switch is determined.

In other words, in one or more embodiments of the present invention, by using two types of relay switches at discharge operation, abnormality of the two types of relay switches is determined. In a control flow of the abnormality determination unit 42, when the number of charging times is an even number, the relay contact 11 is turned on and the relay contact 21 is turned off and abnormality of the relay switch is determined. Also, when the number of charging times is an odd number, abnormality of the relay switch is determined by turning off the relay contact 11 and turning on the relay contact 21. In this way, when abnormality occurs at either one of the relay contacts between relay contact 11 and relay contact 21, the relay contact where the abnormality has occurred can be specified. Accordingly, the relay device according to one or more embodiments of the present invention can improve safety of the relay.

Further, in one or more embodiments of the present invention, after calculation of the abnormality determination times, when the number of abnormality determination times is 2 or more, abnormality of the relay switch is notified. In this way, determination accuracy of abnormality can be improved.

Moreover, in one or more embodiments of the present invention, when discharge of the electric charge of the capacitor 32 cannot be performed in a state where either one of the first relay switch and second switch is turned on and the other relay switch is turned off, the electric charge is discharged in a state in which the other relay switch is turned on and the one relay switch is turned off. In this way, when one relay switch does not become a closed state such as by freezing, etc., the electric charge of the capacitor 32 can be discharged using the other relay switch.

Further, in one or more embodiments of the present invention, when the electric charge cannot be discharged in a state where either one of the first relay switch and the second relay switch is turned on, foreign-matter removal control for removing foreign matters at the contact point is executed to the one relay switch. In this way, the foreign matters adhered to the contact point of the other relay switch can be removed.

Additionally, in one or more embodiments of the present invention, abnormality determination by the abnormality determination unit 42 may be executed before start of charging after driving of the charger 100. Also, the foreign-matter removal control by the foreign-matter-removal control unit 43 may be executed before the next charging after charging of the battery for a vehicle.

More, in one or more embodiments of the present invention, after having charged once, abnormality of the first relay switch and second relay switch is determined by mutually switching between the first relay switch and the second relay switch. For example, among the specified discharge time after completion of charge, abnormality of the first relay switch is determined for the first half of the time and abnormality of the second relay switch is determined for the latter half of the time. In abnormality determination of the first relay switch, the abnormality determination unit 42 turns on the first relay switch, and in a state the second relay switch is turned off, abnormality of the first relay switch is determined based on the detected voltage by the voltage sensor 5. Also, in abnormality determination of the second relay switch, the abnormality determination unit 42 turns on the first relay switch and in a state the second relay switch is turned on, abnormality of the second relay switch is determined based on the detected voltage by the voltage sensor 5.

Figure 6:
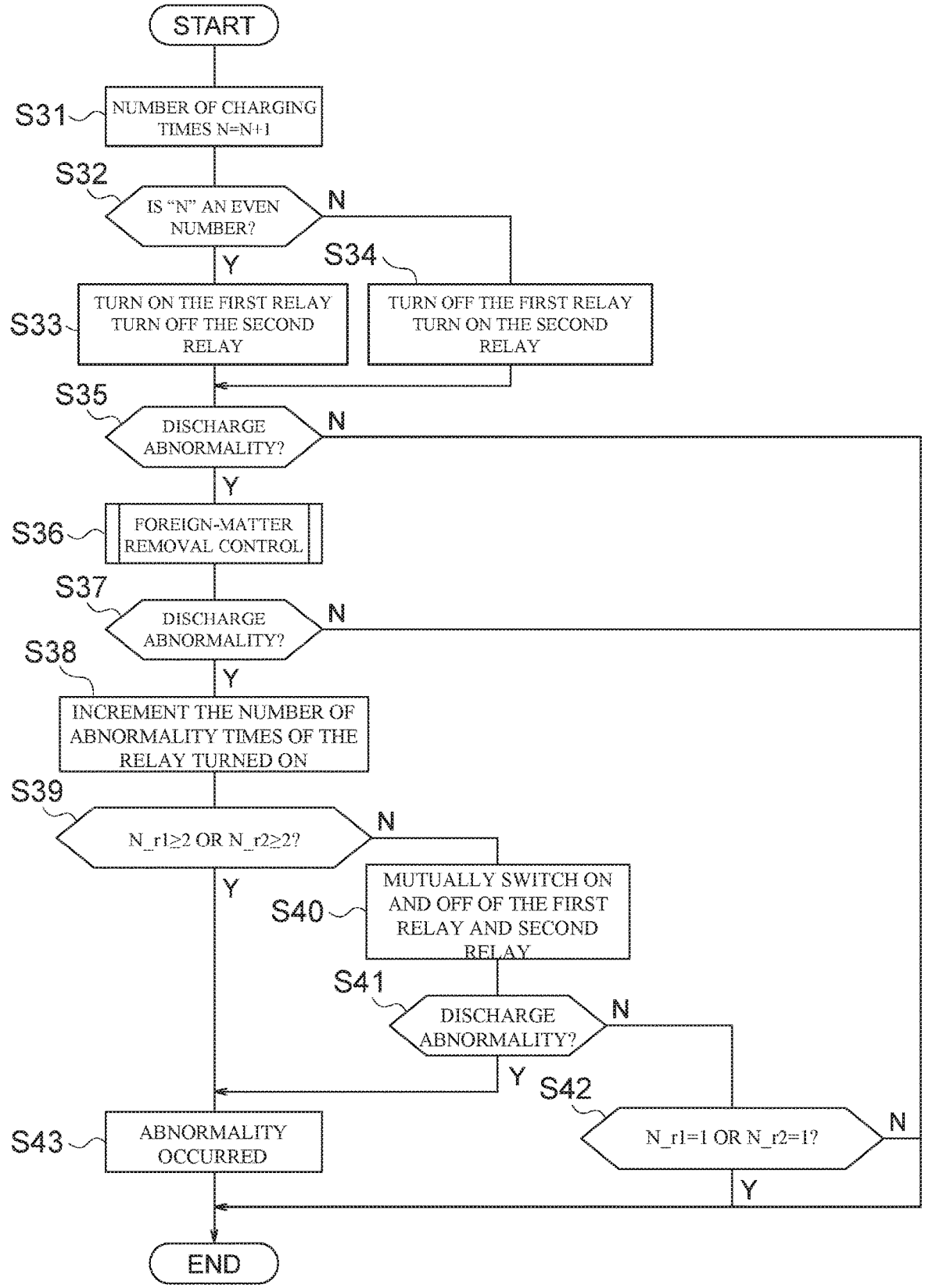
FIG. 6 is a flowchart showing a control flow of a controller in a relay device according to one or more embodiments of the present invention.

A relay device according to additional embodiments of the present invention will be described. FIG. 6 is a flowchart indicating a control flow of the controller in a relay device. In the present embodiment, compared to one or more of the above embodiments, timing for executing the foreign-matter removal control differs. Other contents and structures of the control flow are similar to the above, and description thereof will be applied.

After charging of the charger 100, the abnormality determination unit 42 executes the control flow shown in FIG. 6. The control flow between step 31 to step 35 is similar to step 1 to step 5 executed at the abnormality determination unit 42 described above.

In the control flow in step 35, when determination is made that there is discharge abnormality, the foreign-matter-removal control unit 43 executes the foreign-matter removal control in step 36. The foreign-matter removal control is similar to the foreign-matter removal control described above.

In step 37, the abnormality determination unit 42 once again turns on the relay contacts 11 and 21 that were turned on right before the foreign-matter removal control and turns off the relay contacts 11 and 21 that were turned off right before the foreign-matter removal control. The abnormality determination unit 42 detects output voltage of the capacitor 32 using the voltage sensor 5 and compares the detected voltage and the threshold voltage. The abnormality determination unit 42 determines whether or not the discharge abnormality has occurred based on the comparison result. The determination method for the foreign matters is similar to step 35.

For example, in the control flow of step 34, when determination is made that there is discharge abnormality in the control flow of step 35 after turning off the relay contact 11 and turning on the relay contact 21, after execution of the foreign-matter removal control in step 36, the abnormality determination unit 42 determines whether or not discharge is normally performed by turning off the relay contact 11 and turning on the relay contact 21.

When determination is made that discharge is normally performed, the controller 40 ends the control flow. When determination is made that there is discharge abnormality, the control flow proceeds to step 38 from step 37.

The control flow between step 38 to step 43 is similar to step 6 to step 11 executed at the abnormality determination unit 42 as described above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS

1 . . . AC power supply
2 . . . Inverter
3 . . . Rectifier circuit
4 . . . Smoothing circuit
5 . . . Voltage sensor
6 . . . Connector
10 . . . Step
11 . . . Relay contact
12 . . . Exciting coil
13 . . . Temperature sensor
14 . . . Heater
15 . . . First drive circuit
20 . . . Second relay unit
21 . . . Relay contact
22 . . . Exciting coil
23 . . . Temperature sensor
24 . . . Heater
25 . . . Second Drive circuit
31 . . . Discharge resistance
32 . . . Capacitor
40 . . . Controller
41 . . . Memory
42 . . . Abnormality determination unit
43 . . . Foreign-matter-removal control unit
50 . . . Alarm unit
100 . . . Charger 200 . . . Vehicle
210 . . . Battery
220 . . . Relay for a vehicle

What is claimed is:

1. A relay device comprising:
   a capacitor included in a charger;
   a discharge circuit that discharges electric charge charged to the capacitor,
   wherein the discharge circuit includes:
      a discharge resistance,
      a first relay switch connected in series to the discharge resistance and having a contact point that becomes a closed state by electric conduction to an exciting coil, and
      a second relay switch connected in parallel to the first relay switch and having a contact point that becomes an open state by electric conduction to an exciting coil,
   a controller, wherein the controller, by mutually switching between a state in which the first relay switch is turned on and the second relay switch is turned off and a state in which the first relay switch is turned off and the second relay switch is turned on, determines abnormality of the first relay switch and the second relay switch;
   wherein, the capacitor is connected in parallel to the connection in series of the first relay switch and the discharge resistance.

2. The relay device according to claim 1,
   wherein the controller:
   calculates a number of abnormality determination times for determining abnormality of the first relay switch or the second relay switch, and
   when the number of abnormality determination times is two or more, notifies abnormality of the relay switch.

3. The relay device according to claim 1, wherein the controller, when the electric charge cannot be discharged in a state in which either one of the first relay switch or the second relay switch is turned on and the other relay switch is turned off, discharges the electric charge in a state in which the other relay switch is turned on and the one relay switch is turned off.

4. The relay device according to claim 1, wherein the controller, when the electric charge cannot be discharged in a state in which either one of the first relay switch or the second relay switch is turned on, executes a foreign-matter removal control for removing foreign matters at a contact point to the one relay switch.

5. The relay device according to claim 1, wherein the controller:
   detects discharge abnormality, when the electric charge of the capacitor cannot be discharged in a state in which either one of the first relay switch and the second relay switch is turned on,
   determines abnormality of the first relay switch in a state in which the first relay switch is turned on and the second relay switch is turned off, and
   determines abnormality of the second relay switch in a state in which the first relay switch is turned off and the second relay switch is turned on.

6. The relay device according to claim 1, wherein the controller, when the electric charge cannot be discharged in a state in which either one of the first relay switch or the second relay switch is turned on and the other relay switch is turned off, discharges the electric charge in a state in which the other relay switch is turned on.

* * * * *